United States Patent
Cushing et al.

(10) Patent No.: US 9,886,460 B2
(45) Date of Patent: Feb. 6, 2018

(54) TUPLE REDUCTION FOR HIERARCHIES OF A DIMENSION

(75) Inventors: David B. Cushing, Ontario (CA); Avery W. Hagleitner, San Jose, CA (US); Jose Vazquez, Union City, NJ (US); Yu Zou, Middletown, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 491 days.

(21) Appl. No.: 13/611,106

(22) Filed: Sep. 12, 2012

(65) Prior Publication Data

US 2014/0074769 A1    Mar. 13, 2014

(51) Int. Cl.
    *G06F 17/30*    (2006.01)

(52) U.S. Cl.
    CPC .. *G06F 17/30321* (2013.01); *G06F 17/30592* (2013.01); *G06F 17/30946* (2013.01)

(58) Field of Classification Search
    CPC .............................................. G06F 17/30592
    See application file for complete search history.

(56) References Cited

U.S. PATENT DOCUMENTS

| | | | |
|---|---|---|---|
| 5,495,608 A | 2/1996 | Antoshenkov | |
| 5,845,113 A | 12/1998 | Swami et al. | |
| 5,960,428 A | 9/1999 | Lindsay et al. | |
| 5,960,429 A | 9/1999 | Peercy et al. | |
| 6,067,542 A | 5/2000 | Carino, Jr. | |
| 6,134,546 A | 10/2000 | Bestgen et al. | |
| 6,144,957 A | 11/2000 | Cohen et al. | |
| 6,163,774 A * | 12/2000 | Lore | G06Q 10/06 705/36 R |
| 6,185,557 B1 | 2/2001 | Liu | |

(Continued)

FOREIGN PATENT DOCUMENTS

| | | | |
|---|---|---|---|
| CN | 101008953 A | * | 8/2007 |
| CN | 100495403 C | * | 6/2009 |
| CN | 104182544 A | * | 12/2014 |

OTHER PUBLICATIONS

Autoexists SQL Server 2008 R2. Datasheet [online]. Microsoft Corporation, Aug. 8, 2011 [retrieved on Apr. 30, 2016; retrieved by Way Back Machine on Aug. 8, 2011]. Retrieved from the Internet: <URL:http://web.archive.org/web/20110808035117/http://msdn.microsoft.com/enus/library/ff487119.aspx>.*

(Continued)

*Primary Examiner* — Alford Kindred
*Assistant Examiner* — Jesse P Frumkin
(74) *Attorney, Agent, or Firm* — Erik K. Johnson; Edell, Shapiro & Finnan, LLC (57) ABSTRACT

According to one embodiment of the present invention, a level of a first hierarchy and a second hierarchy of data attributes is determined where the first hierarchy and the second hierarchy share the determined level and each subordinate hierarchical level. The embodiment further removes from a set of tuples of a database operation at least one tuple that lacks corresponding data in a data source based on the tuple containing elements corresponding to non-intersecting sets of attributes at the determined level. Embodiments of the present invention include a method, system and computer program product for reducing tuple sets in substantially the same manner described above.

15 Claims, 5 Drawing Sheets

(56) References Cited

U.S. PATENT DOCUMENTS

| | | | |
|---|---|---|---|
| 6,473,763 | B1 | 10/2002 | Cori, Jr. et al. |
| 6,618,729 | B1 | 9/2003 | Bhashyam et al. |
| 6,728,697 | B2 | 4/2004 | Leathers |
| 6,775,661 | B1* | 8/2004 | Redner .................. 707/770 |
| 7,113,957 | B1 | 9/2006 | Cohen et al. |
| 7,415,454 | B2* | 8/2008 | Yan .................. G06F 17/30592 |
| 7,512,625 | B2 | 3/2009 | Lariba-Pey et al. |
| 7,698,264 | B2 | 4/2010 | Leikucs et al. |
| 7,895,191 | B2* | 2/2011 | Colossi ............ G06F 17/30312 707/600 |
| 7,945,575 | B2 | 5/2011 | Cushing et al. |
| 8,463,745 | B2* | 6/2013 | Grosset .................. G06F 17/30 707/634 |
| 8,874,514 | B2* | 10/2014 | Grosset .................. G06F 17/30 707/635 |
| 9,069,837 | B2* | 6/2015 | Grosset ............ G06F 17/30592 |
| 9,400,830 | B2* | 7/2016 | Dipper ............. G06F 17/30592 |
| 2002/0026438 | A1 | 2/2002 | Rjaibi et al. |
| 2002/0078015 | A1 | 6/2002 | Ponnekanti |
| 2002/0143755 | A1 | 10/2002 | Wynblatt et al. |
| 2002/0194163 | A1* | 12/2002 | Hopeman et al. ................ 707/3 |
| 2004/0220923 | A1 | 11/2004 | Nica |
| 2004/0267799 | A1* | 12/2004 | Petculescu ........ G06F 17/30592 |
| 2005/0010550 | A1 | 1/2005 | Potter et al. |
| 2005/0065910 | A1* | 3/2005 | Welton et al. .................... 707/2 |
| 2006/0010114 | A1* | 1/2006 | Dumitru et al. .................. 707/3 |
| 2006/0074901 | A1 | 4/2006 | Pirahesh et al. |
| 2007/0219957 | A1* | 9/2007 | D'Hers ............ G06F 17/30592 |
| 2007/0255681 | A1* | 11/2007 | Tien ................. G06F 17/30551 |
| 2008/0027957 | A1* | 1/2008 | Bruckner .......... G06F 17/30412 |
| 2008/0288525 | A1* | 11/2008 | Leikucs ............ G06F 17/30286 |
| 2008/0313184 | A1 | 12/2008 | Li et al. |
| 2009/0198643 | A1* | 8/2009 | Cypher et al. .................... 707/2 |
| 2009/0198663 | A1* | 8/2009 | Yang ................. G06F 17/30592 |
| 2010/0082577 | A1* | 4/2010 | Mirchandani et al. ....... 707/706 |
| 2010/0235345 | A1* | 9/2010 | Joseph ............. G06F 17/30457 707/713 |
| 2011/0208690 | A1 | 8/2011 | Cushing et al. |
| 2011/0218978 | A1 | 9/2011 | Hong et al. |
| 2013/0159245 | A1* | 6/2013 | Frederiksen ...... G06F 17/30592 707/602 |
| 2015/0026113 | A1* | 1/2015 | Raichelgauz .......... H04H 60/48 706/48 |
| 2015/0120698 | A1* | 4/2015 | Plattner ............. G06F 17/30592 707/714 |
| 2015/0269240 | A1* | 9/2015 | Frederiksen ...... G06F 17/30592 707/603 |

OTHER PUBLICATIONS

Fu L. Efficient evaluation of sparse data cubes. InAdvances in Web-Age Information Management Jul. 15, 2004 (pp. 336-345). Springer Berlin Heidelberg.*

Microsoft, "Autoexists," http://msdn.microsoft.com/en-us/library/ff487119(d=printer).aspx (2012), 9 pages.

William Pearson, "MDX at First Glance: Introduction to SQL Server MDX Essentials," http://www.databasejournal.com/features/mssql/article.php/1495511/MDX-at-First-Glance-Introduction-to-SQL-Server-MDX-Essentials.htm, Nov. 6, 2002, 20 pages.

Carl Dubler and Colin Wilcox, "Just What Are Cubes Anyway? (A Painless Introduction to OLAP Technology)," http://msdn.microsoft.com/en-us/library/aa140038(d=printer,v=office.10).aspx, Apr. 2002, 8 pages.

Jim Gray, Adam Bosworth, Andrew Layman, and Hamid Pirahesh, "Data Cube: A Relational Aggregation Operator Generalizing Group-By, Cross-Tab, and Sub-Totals," Data Mining and Knowledge Discovery 1, 29-53 (1997) Kluwer Academic Publishers. Manufactured in The Netherlands.

"Online analytical processing," Wikipedia, the free encyclopedia, http://en.wikipedia.org/wiki/Olap, retrieved Oct. 23, 2012, 7 pages.

"OLAP cube," Wikipedia, the free encyclopedia, http://en.wikipedia.org/wiki/OLAP_cube, retrieved Aug. 30, 2012, 4 pages.

Tico et al, "An Efficient Sparse Data Filtering Method for Image Histogram Comparison", Proceedings of the Scandinavian conference on image analysis 1999, reaearch.nokia.com, 8 pages.

Ji et ai, "Online Recommendation Based on Customer Shopping Model in E-Commerce", Proceedings of the IEEEIWIC International Conference on Web Intelligence, IEEE 2003, 7 pages.

European Search Report from corresponding European Patent Application No. 08153991.8-1527 dated May 25, 2009 (6 pages).

Ying Wang et al., "Efficient Filtering Query Indexing in Data Stream," Web Information Systems-Wise 2006 Workshops Lecture Notes in Computer Science; Lncs, Springer, Berlin, DE, vol. 4256, Jan. 1, 2006 pp. 1-12.

* cited by examiner

| | UNIT SALES | | COLUMNS |
|---|---|---|---|
| <#ALEXANDRA WELLINGTON#> | <#GENDER#> | <#MARITAL STATUS#> | <#1234#> |
| | | <#MARITAL STATUS#> | <#1234#> |
| | <#GENDER#> | <#MARITAL STATUS#> | <#1234#> |
| | | <#MARITAL STATUS#> | <#1234#> |

FIG.4A

| ALEXANDRA WELLINGTON | F | M | |
| --- | --- | --- | --- |
| | | S | 99 |
| | M | M | |
| | | S | |

FIG.4B

| ALEXANDRA WELLINGTON | F | S | 99 |
| --- | --- | --- | --- |

TUPLE REDUCTION FOR HIERARCHIES OF A DIMENSION

BACKGROUND

1. Technical Field

Present invention embodiments relate to On-Line Analytical Processing (OLAP), and more specifically, to removing non-existent tuples from cross-joins of plural hierarchies of a dimension.

2. Discussion of Related Art

OLAP systems allow users to interactively analyse and aggregate multidimensional data. An OLAP database can be conceptualized as a multidimensional array called a "cube." The elements of the cube are "cells" containing a set of numerical "measures." A cell is identified by a tuple of "members" or "data attributes" designating regions of each dimension. For example, in the business domain, sales data may have a time dimension and a geographic area dimension. The time dimension may have a member for each month and the geographic area dimension may have a member for each city. The tuple, (August of 2010, Chicago), identifies a cell of the cube that contains the corresponding set of measures (e.g., unit sales, gross revenue, etc.).

The members of each dimension may be arranged in one or more hierarchies. For example, a geographic area dimension may have a hierarchy that includes levels of Country, State, and City. A time dimension may have levels that include Year, Month, and Day. Hierarchies allow a user to easily request aggregate data at various levels of granularity. By way of example, a user may request data aggregated over a given year and a given state by specifying a tuple, such as (2011, Illinois).

A dimension may have plural hierarchies that share levels. For example, a time dimension may have a Fiscal Calendar hierarchy with levels of Year, Quarter, Month, and Day, while a Regular Calendar hierarchy may include levels of Year, Month, and Day.

A cross-join request may include plural hierarchies of the same dimension that share levels, but not common data, thereby resulting in a request for data that cannot possibly exist. For example, a user may request a cross-join of the members [Fiscal Calendar].[2011].[Q1] and [Regular Calendar].[2011].[January]. These members do not share a common month if the fiscal calendar year begins in July. Thus, no data can satisfy this request. Displaying cells for which no data can possibly exist can impact end-user productivity because users have to disregard those cells.

OLAP reporting tools can apply "null suppression" to remove cells having no data from a visual display. However, null suppression is performed after the query has been processed, and operates on the entire cross-join set of tuples specified by a crosstab report. In another approach, a system may filter a dimension for members where all member attribute values equal those in at least one of the tuples and for which there exists data in the fact table. However, this involves additional SQL queries against the underlying database to check for data existence.

BRIEF SUMMARY

According to one embodiment of the present invention, a level of a first hierarchy and a second hierarchy of data attributes is determined where the first hierarchy and the second hierarchy share the determined level and each subordinate hierarchical level. The embodiment further removes from a set of tuples of a database operation at least one tuple that lacks corresponding data in a data source based on the tuple containing elements corresponding to

2 non-intersecting sets of attributes at the determined level. Embodiments of the present invention further include a method, system and computer program product for reducing tuple sets in substantially the same manner described above.

BRIEF DESCRIPTION OF THE SEVERAL VIEWS OF THE DRAWINGS

Generally, like reference numerals in the various figures designate like components.

DETAILED DESCRIPTION

Present invention embodiments pertain to reducing the set of tuples specified in a cross-join request by removing non-existent tuples (e.g., tuples for which no data exists). In one embodiment, non-existent tuples are removed prior to data retrieval by using hierarchy metadata to determine the level at which different hierarchies of data attributes of the same dimension converge and to identify tuples representing combinations with an empty intersection at the convergence level. No check for data existence against the underlying database is required. In another embodiment, additional information (e.g., fact data) is used to determine a convergence level and identify non-existent tuples.

Figure 1:
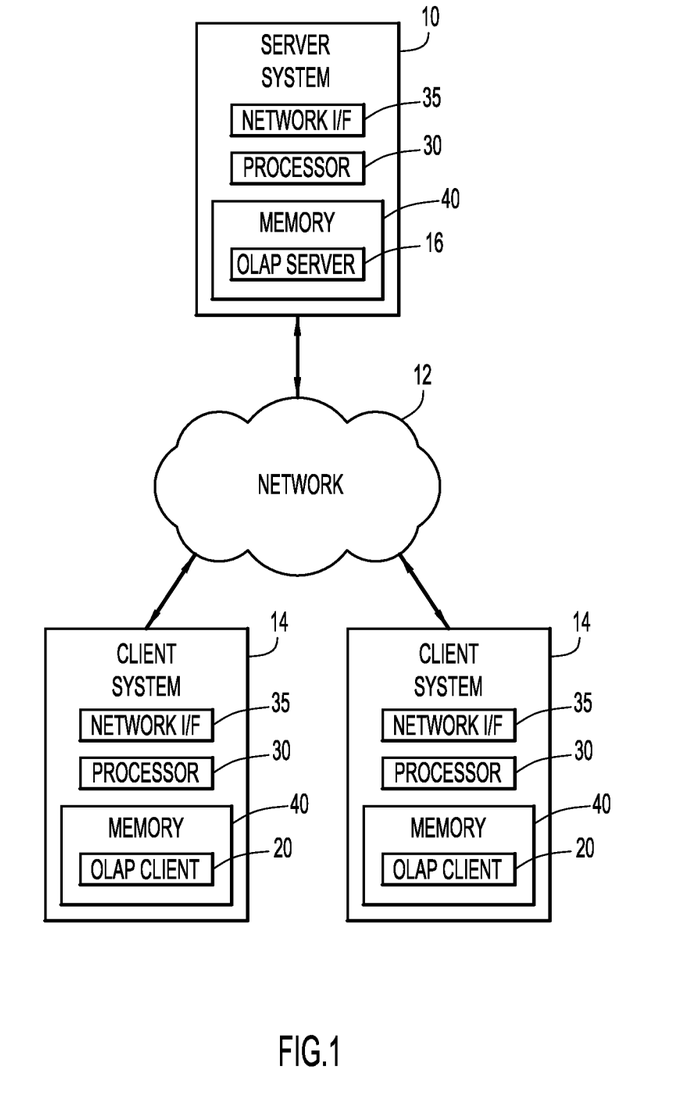
FIG. 1 is a diagrammatic illustration of an example computing environment for use with an embodiment of the present invention.

An example computing environment for use with a present invention embodiment is illustrated in FIG. 1. Specifically, the environment includes one or more server systems 10 and one or more client or end-user systems 14. Server systems 10 and client systems 14 may be remote from each other and communicate over a network 12.

Network 12 may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

Server systems 10 include an OLAP server 16. The OLAP server performs the tuple reduction according to a present invention embodiment and may further include the functionality of any conventional or other OLAP engine, and may be distributed across plural computer systems. Alternatively, OLAP server 16 may reside on a client system 14 or other computer system in communication with the client system.

Client systems 14 enable users to submit OLAP or other queries to server systems 10 to retrieve query results. Queries may be submitted using Multidimensional Expressions (MDX) or other suitable query language. The client systems may include an OLAP client 20, such as a spreadsheet, report generator, or other client software, and present any graphical user (e.g., GUI, etc.) or other interface (e.g., command line prompts, menu screens, etc.) to solicit queries from users and display results.

Server systems 10 and client systems 14 may be implemented by any conventional or other computer systems preferably equipped with a display or monitor, a base (e.g., including at least one processor 30, memories 40 and/or internal or external network interface or communications devices 35 (e.g., modem, network cards, etc.)), optional input devices (e.g., a keyboard, mouse, or other input device), and any commercially available and custom software (e.g., reporting software, spreadsheet software, communications software, server software, OLAP clients, OLAP servers, relational database clients, relational database servers, etc.). The computer systems may include server, desktop, laptop, and hand-held devices.

In addition, OLAP server 16 and OLAP client 20 may include one or more modules or units to perform the various functions of present invention embodiments described below (e.g., reducing tuples, etc.), may be implemented by any combination of any quantity of software and/or hardware modules or units, and may reside within memory 40 of the server and/or client systems for execution by processor 30.

Figure 2:
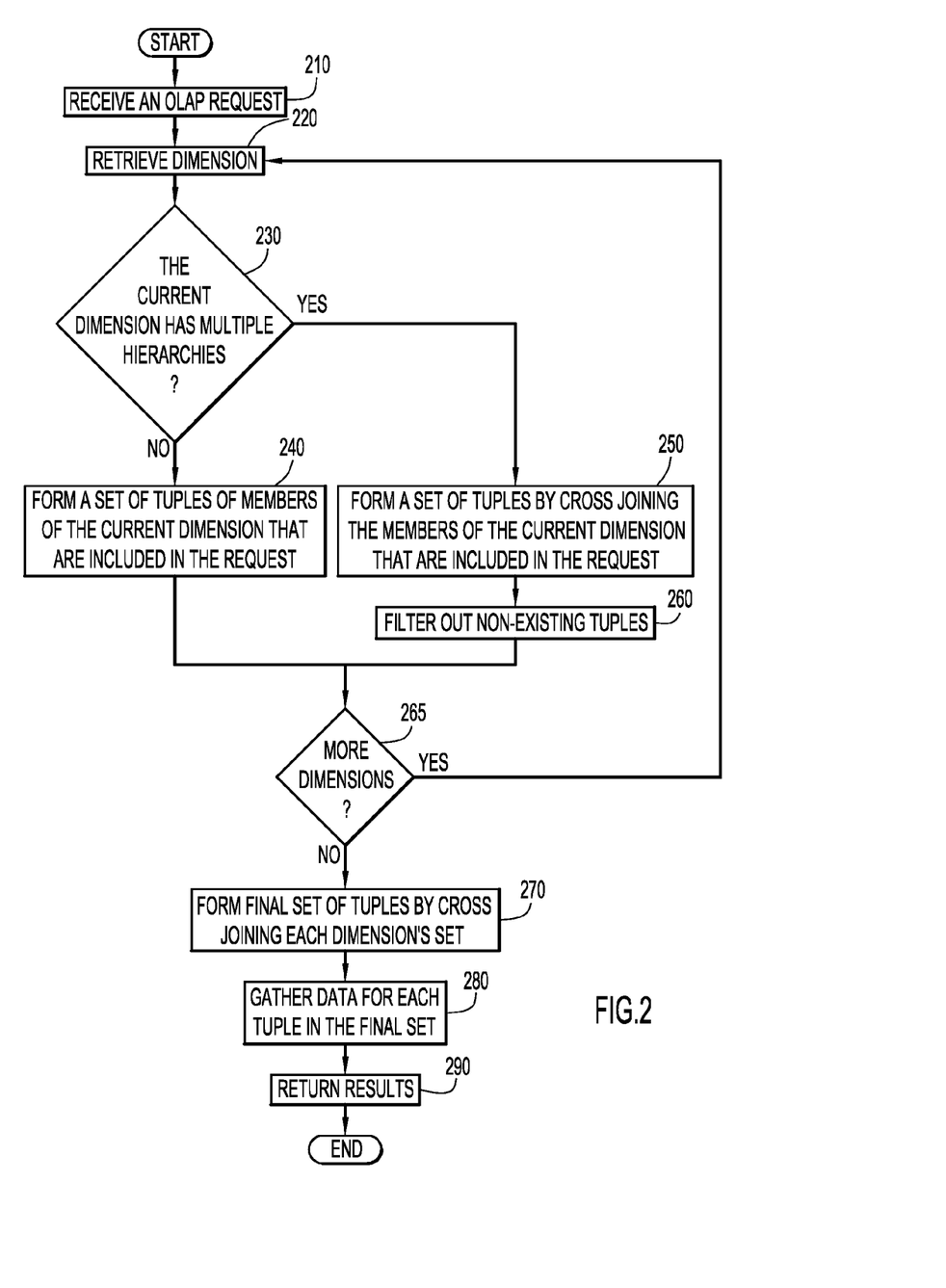
FIG. 2 is a flow diagram illustrating a manner in which an OLAP query is executed according to an embodiment of the present invention.

A manner in which OLAP server 16 processes an OLAP query (e.g., via server system 10) according to an embodiment of the present invention is illustrated in FIG. 2. Initially, the OLAP server (e.g., via server system 10) receives a request at step 210. The request preferably includes a cross-join involving plural hierarchies of data attributes of the same dimension. A dimension included in the cross-join is retrieved at step 220. The OLAP server determines at step 230 whether the dimension has plural hierarchies. This may be accomplished by examining hierarchy metadata. If the current dimension does not have plural hierarchies, the OLAP server at step 240 forms a set of tuples containing the members of the current dimension that are included in the request. Each set of tuples is stored.

If the current dimension does have plural hierarchies as determined at step 230, the OLAP server at step 250 forms a set of tuples by cross-joining the members of the current dimension that are included in the request. At step 260, the set of tuples is filtered as described below to remove non-existing tuples (e.g., tuples for which no data exists). Each filtered set of tuples is stored. Once each dimension in the OLAP request has been processed as determined at step 265, the OLAP server cross-joins the saved sets of tuples at step 270 to form a final set of tuples. The order of members within the tuples is managed across the cross-joins so that tuples in the final set correspond to the request. At step 280, the data corresponding to each tuple in the final set is retrieved from the underlying data source, and the results are returned (e.g., as a set of tuples formed by merging each tuple of the final set with its corresponding result) at step 290.

Accordingly, an embodiment of the present invention may view a cross-join set as a set of tuple lists (e.g., a list of tuples saved at steps 240 and 260), instead of an expanded, single set of tuples for all possible combinations of cross-join values. Each of these constituent tuple lists represents a set of tuples to be cross-joined. Non-existent tuple reduction can be applied to an array or other grouping of tuple lists representing a cross-join set. The tuple reduction may be performed for some of the tuples lists separately based on, for example, which hierarchies are in each tuple list and which combinations will be fastest to process, rather than performing the tuple reduction for the full cross-join.

Figure 3:
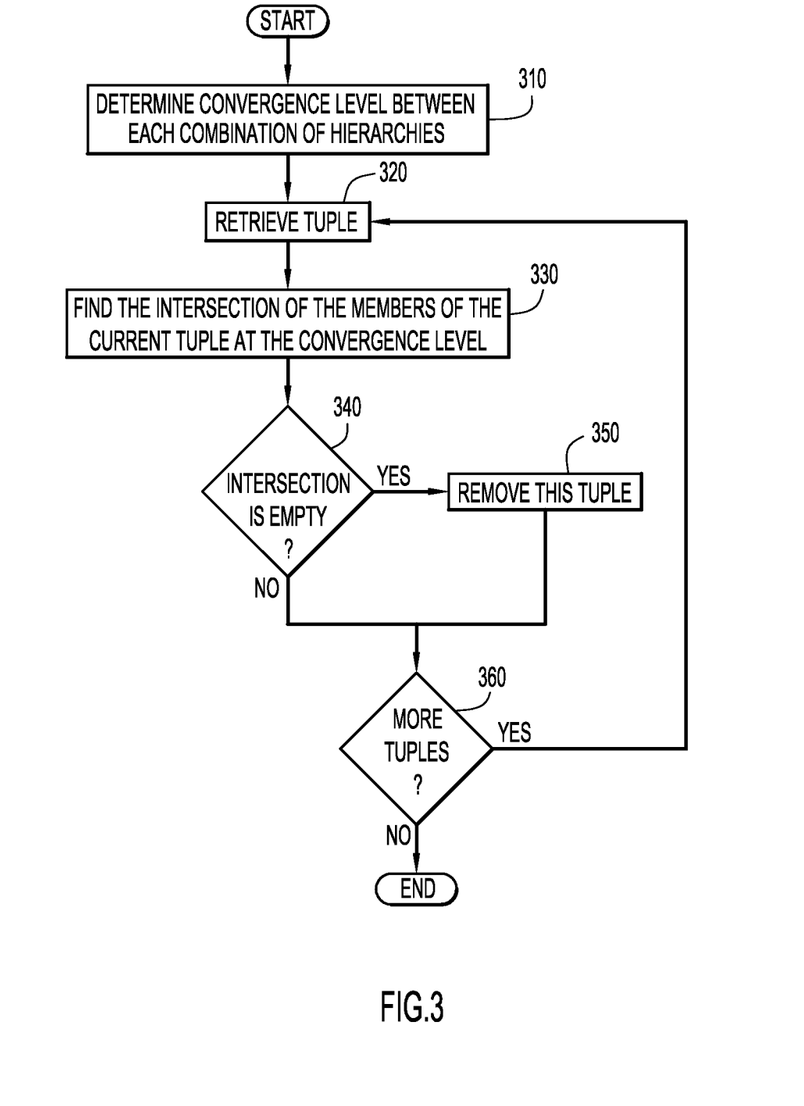
FIG. 3 is a flow diagram illustrating a manner of filtering tuples for the flow diagram of FIG. 2 according to an embodiment of the present invention.

A manner in which OLAP server 16 filters non-existing tuples (e.g., step 260 of FIG. 2) (e.g., via server system 10) according to an embodiment of the present invention is illustrated in FIG. 3. At step 310, the OLAP server determines the levels at which each combination of the data attribute hierarchies of the current dimension converge. A level is designated as a convergence level of plural hierarchies of the same dimension if the hierarchies share the particular level and all levels below that particular level. For example, in the case of a time dimension with RegularCalendar and FiscalCalendar hierarchies as shown in the Time Dimensions Hierarchy Table below, the convergence level is Month.

| Time Dimensions Hierarchy Table: (Fiscal year beginning in July). | | |
|---|---|---|
| Hierarchies | RegularCalendar | FiscalCalendar |
| Levels | Year | FiscalYear |
|  | Quarter | FiscalQuarter |
|  | Month | Month |
|  | Day | Day |

The members of a hierarchy form a tree. A member may be a parent to plural members at the level below. For example, [FiscalCalendar].[2010] is a member of the FiscalCalendar Hierarchy of the time dimension, and the children of [FiscalCalendar].[2010] are [FiscalCalendar].[2010].[Q1], [FiscalCalendar].[2010].[Q2], [FiscalCalendar].[2010].[Q3], and [FiscalCalendar].[2010].[Q4]. A member has no more than one parent. Metadata describing the hierarchies and trees is available to the OLAP server.

A tuple in the current dimension's tuple set is retrieved at step 320. The OLAP server at step 330 finds the intersection of the members of the current tuple at the convergence level (or at least enough information to determine if the intersection is empty). At step 340, the OLAP server determines if the intersection is empty. If the intersection is empty, the tuple cannot contain data and is removed from the tuple set at step 350. The above filtering is performed for each tuple as determined at step 360.

An example of a tuple that can contain data is ([Time].[RegularCalendar].[2010].[Q1], [Time].[FiscalCalendar].[2010].[Q3]). At the convergence level of Month, the descendants are

[Time].[RegularCalendar].[2010].[Q1]: January, February, and March; and

[Time].[FiscalCalendar].[2010].[Q3]: January, February, and March.

The members have a non-empty intersection (e.g., January, February, and March) at the convergence level. The presence of an intersection at the convergence level and below indicates that there will be an entry in the data and the tuple cannot be removed.

An example of a tuple that could not correspond to data, and would be removed is ([Time].[RegularCalendar].[2010].[Q1], [Time].[FiscalCalendar].[2010].[Q1]). With the convergence level of Month, the descendants are

[Time].[RegularCalendar].[2010].[Q1]: January, February, and March; and

[Time].[FiscalCalendar].[2010].[Q1] July, August, and September.

Since there is no intersection at the convergence level and below, there is no corresponding entry in the data, and the tuple may be removed.

The tuple removal may be applied at set expressions, and in the context of evaluating functions, such as BOTTOMCOUNT. Without removing non-existent tuples, the BOTTOMCOUNT function, for example, could return a set of tuples that do not correspond to actual data and would be considered null. With non-existent tuples removed, the set of tuples is first reduced to the set of tuples that could correspond to data, and then the function is applied on that set, thereby returning results that reflect actual, existent cell data.

Aspects of non-existent tuple removal according to an embodiment of the present invention are further described with examples using the sample data in the Purchases and Customer Data Tables below.

Purchases Table:

| Customer Name | Year | Month | Day | Units Purchased |
|---|---|---|---|---|
| Alexandra | 2009 | January | 1 | 1 |
| Cathy | 2009 | March | 1 | 2 |
| Edwina | 2009 | July | 1 | 1 |
| Alexandra | 2009 | September | 1 | 2 |
| Bob | 2009 | November | 1 | 2 |
| Alexandra | 2010 | February | 1 | 1 |
| David | 2010 | July | 1 | 1 |
| Alexandra | 2010 | August | 1 | 2 |

Customer Data Table:

| Customer Name | Gender | Marital Status | City | State | Country |
|---|---|---|---|---|---|
| Alexandra | F | S | Annapolis | Maryland | USA |
| Bob | M | M | Baltimore | Maryland | USA |
| Cathy | F | M | Richmond | Virginia | USA |
| David | M | M | Vienna | Virginia | USA |
| Edwina | F | S | Baltimore | Maryland | USA |

In the examples below, the information in the above Tables is considered to have been loaded into an OLAP system. The cube has a time dimension and a customer dimension. Each cell of the cube contains one measure, number of units purchased. The customer dimension has three hierarchies: Customer, Gender, and Marital Status. These hierarchies have the levels shown in the Customer Dimension Hierarchies Table below.

Customer Dimension Hierarchies Table:

| Hierarchies | Customer | Gender | Marital Status |
|---|---|---|---|
| Levels | Country<br>State<br>City<br>Name | Gender<br>Name | Marital Status<br>Name |

The time dimension has RegularCalendar and FiscalCalendar hierarchies as shown above in the Time Dimension Table.

In one example, a user submits a request to OLAP server 16 for unit purchase data aggregated according to gender and marital status. An example query has the form shown below.

```
SELECT
    CROSSJOIN
        ( [Customer].[Gender].children, [Customer].[MaritalStatus].children,
            [Measures].[Purchases] ) ON COLUMNS
FROM
    [cube]
```

Without removing non-existent tuples, the OLAP server would produce a set of tuples such as the following:

```
{
(Female,     Married,    2),
(Female,     Single,     7),
(Male,       Married,    3),
(Male,       Single,     NULL)
}.
```

With the non-existent tuple reduction, the results become:

```
{
(Female,     Married,    2),
(Female,     Single,     7),
(Male,       Married,    3)
}.
```

The OLAP server notices that [Customer].[Gender] and [Customer].[MaritalStatus] belong to separate hierarchies of the same dimension. The OLAP server further finds that the two hierarchies converge at the Name level, and that Male and Single do not intersect (e.g., their sub-trees have no names in common). As a result, the OLAP server does not attempt to retrieve data corresponding to the (Male, Single) tuple, and it does not include a (Male, Single, Units) tuple in the results set.

The system does not have to access the fact table to discover that there is no intersection between Male and Single because it can examine the set of names under the corresponding nodes of the hierarchy tree by consulting the metadata. The individual names are members of a level in each hierarchy.

In another example, a user requests aggregate units for each name, gender, fiscal quarter, and regular calendar month. The OLAP server cross-joins names with genders, and filters out the non-existing pairs. It also cross-joins fiscal quarters with months, and filters out the non-existing pairs. The OLAP server further cross-joins the two resulting filtered sets, keeping track of the order of the elements to make sure that the final tuple has its elements in the requested order.

In still another example, a user requests sales data for a combination of more than two hierarchies belonging to the same dimension, specifically for name, gender, and marital status, in the year 2009. An example of the MDX has the form:

```
SELECT
    CROSSJOIN ( [Customer].[Customer].[Name].children,
        [Customer].[Gender].[Gender].children,
        [Customer].[MaritalStatus].[MaritalStatus].children,
        [Measures].[Purchases] ) ON COLUMNS
FROM
    [cube]
WHERE
    [Time].[RegularCalendar].[Year] = 2009.
```

To avoid ambiguity in the above MDX, the sub-expressions in the CROSSJOIN are qualified in the form of [Dimension].[Hierarchy].[Level].function.

Without removing non-existent tuples, the results include:

```
{
(Alexandra,    Female,    Married,    NULL),
(Alexandra,    Female,    Single,     3),
(Alexandra,    Male,      Married,    NULL),
(Alexandra,    Male,      Single,     NULL),
(Bob,          Female,    Married,    NULL),
(Bob,          Female,    Single,     NULL),
(Bob,          Male,      Married,    2),
(Bob,          Male,      Single,     NULL),
   ..., etc.
}.
```

With non-existent tuple removal, this reduces to:

```
{
(Alexandra,    Female,    Single,     3),
(Bob,          Male,      Married,    2),
(Cathy,        Female,    Married,    2),
(David,        Male,      Married,    0),
(Edwina,       Female,    Single,     1)
}.
```

In executing this request, an embodiment of the present invention may cross-join {Alexandra, Bob, Cathy, David, Edwina} with {Male, Female}, filter the result, cross-join the filtered result with {Single, Married}, and then filter those results. The OLAP server is configured to find an intersection between (Bob, Male) and (Single), for example. Alternatively, an embodiment of the present invention may form {Alexandra, Bob, Cathy, David, Edwina}×{Male, Female}×{Single, Married} and filter the results in one pass as shown above in FIGS. 2 and 3.

The OLAP server may include any method of implementing responses to an OLAP query. The OLAP server may be of any type (e.g., Multidimensional OLAP (MOLAP), Relational OLAP (ROLAP), and Hybrid OLAP (HOLAP) using any combination of schemes to store data and metadata, including any kinds of arrays (e.g., flat multidimensional arrays, structures optimized for sparse arrays, etc.), star schema, snowflake schema, conventional relational schema, etc. The dimensions and hierarchies may be generic, user defined, or automatically generated.

An embodiment of the present invention may determine whether an operable convergence level among multiple hierarchies of a single dimension exists and may construct a convergence level even if the hierarchies of a dimension do not have a convergence level visible to users. For example, a time dimension may contain Year/Month and a Year/Quarter hierarchies which to the user do not have a convergence level. In this situation, one embodiment of the present invention would not remove tuples since there is no convergence level defined by user-created metadata, although in many cases hierarchies are modeled with a convergence level because it provides consistency. Another embodiment of the present invention looks for a common relationship between the hierarchies and the data which is known to the system and which can be used as the convergence level. In the time example above, if data is retained at the day level (e.g., in a fact table of a ROLAP system or in cells of MOLAP system), both the Year/Month and Year/Quarter hierarchies use a join relationship at the granularity of "day" to the data, and the instances of "day" may be used as the convergence "level". In short, the convergence level between hierarchies may not be visible to users, but it still exists within the system and can be used to implement an embodiment of the present invention.

Figure 4A:
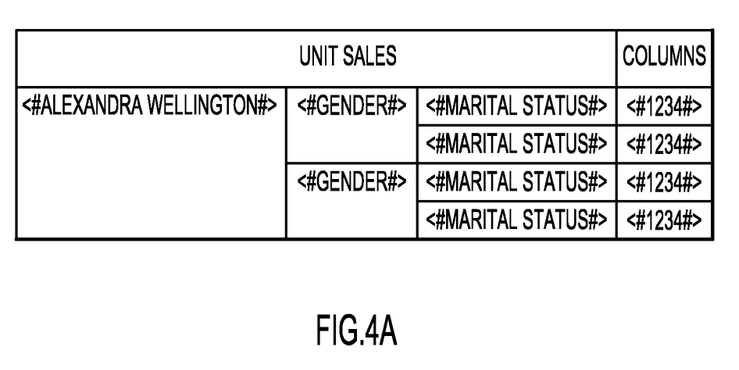
FIG. 4A is an illustration of an example report specification including a cross-join of plural hierarchies of the same dimension.
Figure 4B:
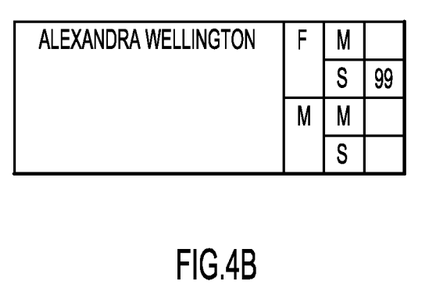
FIG. 4B is an illustration of an example report according to the report specification illustrated in FIG. 4A without filtering tuples.
Figure 4C:
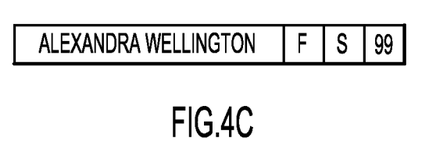
FIG. 4C is an illustration of an example report according to the report specification illustrated in FIG. 4A with filtering of tuples according to an embodiment of the present invention.

A query can be generated directly or indirectly from any combination of languages such as MDX, SQL, a report specification language, etc. For example, a query may be executed by running a report specification as illustrated in FIG. 4A to generate reports as illustrated in FIGS. 4B (without non-existent tuple removal) and 4C (with non-existent tuple removal).

It will be appreciated that the embodiments described above and illustrated in the drawings represent only a few of the many ways of implementing tuple reduction for hierarchies of a dimension.

A query can be generated directly or indirectly from any combination of languages such as MDX, SQL, a report specification language, etc. Results may be presented in any format including text and graphics representing sets, tables, charts, etc.

The topology or environment of the present invention embodiments may include any number of computer or other processing systems (e.g., client or end-user systems, server systems, etc.) and OLAP engines, databases, or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any commercially available or custom software (e.g., spreadsheets, report generation software, communications software, server software, database software, OLAP servers, OLAP clients, etc.). These systems may include any types of monitors and input devices (e.g., keyboard, mouse, voice recognition, touch screen, etc.) to enter and/or view information.

It is to be understood that the software (e.g., OLAP server, OLAP client, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., OLAP server, OLAP client, etc.) may be available on a computer useable or recordable medium (e.g., magnetic or optical mediums, magneto-optic mediums, floppy diskettes, CD-ROM, DVD, memory devices, etc.) for use on standalone systems or systems connected by a network or other communications medium.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other OLAP systems, databases, data stores or storage structures (e.g., files, databases, data structures, data or other repositories, etc.) to store information (e.g., cubes, arrays, fact tables, dimension tables, conventional relational tables, indexes, metadata, etc.). Database systems may be implemented by any number of any conventional or other databases, data stores or storage structures (e.g., files, databases, data structures, data or other repositories, etc.) to store information (e.g., cubes, arrays, fact tables, dimension tables, conventional relational tables, indexes, metadata, etc.). The OLAP server and/or OLAP client may be included within or coupled to the server and/or client systems. The OLAP or OLTP data storage structures may be remote from or local to the computer or other processing systems, and may store any desired data (e.g., rules, data to be analyzed, etc.).

Present invention embodiments may be utilized for executing queries for any types of database systems, data structures, database operations (e.g., any types of joins, etc.), data measures (e.g., categorical, numerical, integer, floating point, strings, etc.), and dimensions (e.g., categorical, numerical, integer, floating point, strings, etc.) representing any information from any domain (e.g., business, finance, science, medicine, etc.).

The tuple sets filtered and results may be of any size, displayed as any number of pages, and include any type of data (e.g., boolean, character, alphanumeric, numeric, symbols, etc.) representing any information.

The present invention embodiments may employ any number of any type of user interface (e.g., Graphical User Interface (GUI), command-line, prompt, etc.) for obtaining or providing information (e.g., obtaining information for the desired query, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks, algorithms, or network/environment described above, but may be utilized for filtering any type of ordered sets in a manner to remove ordered sets corresponding to intersections of non-overlapping sets.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method comprising:
    determining an upper level of each of a first hierarchy and a second hierarchy of data attributes of a dimension of a data source where the first hierarchy and the second hierarchy share the determined level and each subordinate hierarchical level below the determined level, wherein, in response to the first hierarchy and the second hierarchy lacking a shared level, constructing an operable shared level as the determined level using a join relationship at a finer level of granularity than the first and second hierarchies, wherein the upper and subordinate hierarchical levels of the first and second hierarchies of data attributes are defined by metadata and the operable shared level is undefined by the metadata; and
    removing from a set of tuples of a database cross-join operation against the data source at least one tuple that lacks corresponding data in the data source based on the tuple containing elements corresponding to non-intersecting sets of attributes at the determined level, wherein the at least one tuple comprises a first data attribute of the first hierarchy and a second data attribute of the second hierarchy, and removing the at least one tuple comprises:
        forming a first set of data attributes comprising each attribute at the determined level descended from the first attribute;
        forming a second set of data attributes comprising each attribute at the determined level descended from the second attribute; and
        removing the at least one tuple from the set of tuples in response to determining that the first set of data attributes and the second set of data attributes have no data attribute in common.

2. The method of claim 1, wherein the database operation relates to execution of an On-Line Analytical Processing query.

3. The method of claim 2, wherein the first hierarchy and the second hierarchy are hierarchies of a common dimension of an On-Line Analytical Processing data model.

4. The method of claim 1, wherein the determination of the shared level is based on metadata.

5. The method of claim 1, wherein the construction of the operable shared level is based on data of the data source.

6. A system comprising:
    at least one processor and memory configured to:
        determine an upper level of each of a first hierarchy and a second hierarchy of data attributes of a dimension of a data source where the first hierarchy and the second hierarchy share the determined level and each subordinate hierarchical level below the determined level, wherein, in response to the first hierarchy and the second hierarchy lacking a shared level, constructing an operable shared level as the determined level using a join relationship at a finer level of granularity than the first and second hierarchies, wherein the upper and subordinate hierarchical levels of the first and second hierarchies of data attributes are defined by metadata and the operable shared level is undefined by the metadata; and remove from a set of tuples of a database cross-join operation against the data source at least one tuple that lacks corresponding data in the data source based on the tuple containing elements corresponding to non-intersecting sets of attributes at the determined level, wherein the at least one tuple comprises a first data attribute of the first hierarchy and a second data attribute of the second hierarchy, and removing the at least one tuple comprises:
  forming a first set of data attributes comprising each attribute at the determined level descended from the first attribute;
  forming a second set of data attributes comprising each attribute at the determined level descended from the second attribute; and
  removing the at least one tuple from the set of tuples in response to determining that the first set of data attributes and the second set of data attributes have no data attribute in common.

7. The system of claim 6, wherein the database operation relates to execution of an On-Line Analytical Processing query.

8. The system of claim 7, wherein the first hierarchy and the second hierarchy are hierarchies of a common dimension of an On-Line Analytical Processing data model.

9. The system of claim 6, wherein the determination of the shared level is based on metadata.

10. The system of claim 6, wherein the construction of the operable shared level is based on data of the data source.

11. A computer program product comprising:
  a non-transitory computer readable storage medium having computer readable program code embodied therewith, the computer readable program code comprising computer readable program code, when executed by a hardware processor with a memory, causes the hardware processor to:
    determine an upper level of each of a first hierarchy and a second hierarchy of data attributes of a dimension of a data source where the first hierarchy and the second hierarchy share the determined level and each subordinate hierarchical level below the determined level, wherein, in response to the first hierarchy and the second hierarchy lacking a shared level, constructing an operable shared level as the determined level using a join relationship at a finer level of granularity than the first and second hierarchies, wherein the upper and subordinate hierarchical levels of the first and second hierarchies of data attributes are defined by metadata and the operable shared level is undefined by the metadata; and
    remove from a set of tuples of a database cross-join operation against the data source at least one tuple that lacks corresponding data in the data source based on the tuple containing elements corresponding to non-intersecting sets of attributes at the determined level, wherein the at least one tuple comprises a first data attribute of the first hierarchy and a second data attribute of the second hierarchy, and removing the at least one tuple comprises:
      forming a first set of data attributes comprising each attribute at the determined level descended from the first attribute;
      forming a second set of data attributes comprising each attribute at the determined level descended from the second attribute; and
      removing the at least one tuple from the set of tuples in response to determining that the first set of data attributes and the second set of data attributes have no data attribute in common.

12. The computer program product of claim 11, wherein the database operation relates to execution of an On-Line Analytical Processing query.

13. The computer program product of claim 12, wherein the first hierarchy and the second hierarchy are hierarchies of a common dimension of an On-Line Analytical Processing data model.

14. The computer program product of claim 11, wherein the determination of the shared level is based on metadata.

15. The computer program product of claim 11, wherein the construction of the operable shared level is based on data of the data source.

* * * * *